US006981264B1

(12) United States Patent
Lin et al.

(10) Patent No.: US 6,981,264 B1
(45) Date of Patent: Dec. 27, 2005

(54) METHOD FOR HANDLING MULTIPLE PROGRAM EXCEPTIONS ACROSS HETEROGENEOUS SYSTEMS

(75) Inventors: Kung Yi Lin, Irvine, CA (US); Subramaniam Ramamurthi, Rancho Santa Margarita, CA (US)

(73) Assignee: Unisys Corporation, Blue Bell, PA (US)

( * ) Notice: Subject to any disclaimer, the term of this patent is extended or adjusted under 35 U.S.C. 154(b) by 709 days.

(21) Appl. No.: 10/053,443

(22) Filed: Jan. 17, 2002

(51) Int. Cl.[7] .............................................. G06F 3/00
(52) U.S. Cl. .................................................... 719/310
(58) Field of Search ......................... 719/310; 714/244

(56) References Cited

U.S. PATENT DOCUMENTS

| | | | |
|---|---|---|---|
| 5,237,700 A | * | 8/1993 | Johnson et al. ............. 712/244 |
| 5,590,334 A | * | 12/1996 | Saulpaugh et al. ......... 719/315 |
| 5,815,702 A | | 9/1998 | Kannan et al. |
| 5,815,708 A | | 9/1998 | Kessler et al. |
| 5,892,945 A | | 4/1999 | Mirchandaney et al. |
| 5,923,863 A | | 7/1999 | Adler et al. |
| 6,182,243 B1 | | 1/2001 | Berthe et al. |
| 6,314,555 B1 | * | 11/2001 | Ndumu et al. .............. 717/101 |
| 6,323,881 B1 | * | 11/2001 | Broulik et al. .............. 715/744 |
| 6,823,464 B2 | * | 11/2004 | Cromer et al. .............. 713/202 |

OTHER PUBLICATIONS

David L. Black, The Mach Exception handing facility, 1988.*

* cited by examiner

*Primary Examiner*—Meng-Al T. An
*Assistant Examiner*—LeChi Truong
(74) *Attorney, Agent, or Firm*—Alfred W. Kozak; Mark T. Starr; Lise A. Rode

(57) ABSTRACT

A method for providing a program which executes a sequence for handling a suspended task. The method includes the steps of performing a security check on a mainframe server. The program then detects a response from the suspended task, and then monitors and handles the response. Finally, the program re-activates the suspended task with the response.

8 Claims, 6 Drawing Sheets

SECURITY CHECK

MONITOR RESPONSE

MONITOR RESPONSE

METHOD FOR HANDLING MULTIPLE PROGRAM EXCEPTIONS ACROSS HETEROGENEOUS SYSTEMS

FIELD OF THE INVENTION

The present invention generally relates to the field of exception handling and in particular to a method for handling multiple program exceptions across heterogeneous systems, thus providing interactive, simultaneous, and duplex communication between several object programs (tasks) in a mainframe and a PC client.

BACKGROUND OF THE INVENTION

A typical mainframe system consists of multiple client terminals accessing a mainframe server. At given time, a plurality of tasks is running on the mainframe system. The tasks can be initiated, destroyed, or modified via one of the client terminals.

An exception is an error condition that changes the normal flow of control in a program, or task. An exception may be generated ("raised") by hardware or software. Hardware exceptions include reset, interrupt or a signal from a memory management unit. Exceptions may be generated by the arithmetic logic unit or floating-point unit for numerical errors such as divide by zero, overflow or underflow, or instruction decoding errors such as privileged, reserved, trap or undefined instructions. Software exceptions are even more varied and the term could be applied to any kind of error checking which alters the normal behavior of the program.

When an exception occurs within a task running on a mainframe, the task may become suspended. In order for the task to resume, operation intervention is required. Operation intervention is also required for circumstances where tasks become suspended, but no exception occurs. For example, if a task requires the addition of a file from a particular tape or drive, the task will wait until the required file is provided. Although no actual error occurred within the code or hardware running the task, the task still becomes suspended, and requires operator intervention.

Because mainframe systems can run multiple tasks at the same time, it is possible for more than one task to become suspended at a given time. Some of the tasks may have encountered exceptions, while other tasks may have been suspended for reasons other than exceptions. Thus, the need arises for handling multiple program exceptions within a mainframe environment, or within other heterogeneous systems.

One prior art method to which the method of the present invention generally relates is described in U.S. Pat. No. 5,892,945 entitled METHOD AND APPARATUS FOR DISTRIBUTING WORK GRANULES AMONG PROCESSES BASED ON THE LOCATION OF DATA ACCESSED IN THE WORK GRANULES. This prior art reference is a method and apparatus for distributing work granules of a parent task among processes running on various nodes in a multi-processing computer system. The parent task is divided into work granules of varying sizes based on the location of the data that must be accessed to perform the work granules. At least one process on each of the nodes that will be assisting in the execution of the parent task is initially assigned a work granule based on efficiency considerations. Such efficiency considerations may include, for example, the location of the data to be accessed relative to the process, the current I/O load of the devices on which data to be accessed is stored, and the relative sizes of the various work granules. When a process completes the work granule assigned to it, the process is assigned one of the remaining unassigned work granules. Again the work granule assignment is made based on efficiency considerations. This process continues until all of the work granules have been completed.

The present invention differs from the prior art in U.S. Pat. No. 5,892,945 in that the present invention is does not deal with distributing work from a parent task to children tasks. Instead, the present invention communicates between the task on a host and the task on a client. When a task on a host is suspended by the operating system, the present invention enables the task on a host to communicate with the task on a client PC interactively.

Another prior art method to which the method of the present invention generally relates is detailed in U.S. Pat. No. 6,182,243 entitled SELECTIVE DATA CAPTURE FOR SOFTWARE EXCEPTION CONDITIONS. This prior art reference, a selective data capture method for software exception conditions in the operation of a data processing system, includes steps for describing the pertinent data to collect before loss of control of the faulty program occurs. First the program preventively declares in a table all the data to capture in case of error (501). In a second stage, at the key points of the code, the pertinent sets of data in the table are activated (502). On the occurrence of an error (503), only the data previously declared and activated are collected (504) by the external code in charge of managing the error reporting to a maintenance subsystem (505). The art of U.S. Pat. No. 6,182,243 is attached to a global data capture strategy, particularly to an Error Notification and Selective Dump processes.

The present invention differs from the U.S. Pat. No. 6,182,243 in that error exceptions are only an ancillary part of the present invention. The present invention additionally addresses the need for system resources such as extra disk space or a new tape media. The prior technique, on the other hand, solely relates to capturing data before a program fault, and returning the captured data to the appropriate caller.

Another prior art method to which the method of the present invention generally relates is detailed in U.S. Pat. No. 5,923,863 entitled SOFTWARE MECHANISM FOR ACCURATELY HANDLING EXCEPTIONS GENERATED BY INSTRUCTIONS SCHEDULED SPECULATIVELY DUE TO BRANCH ELIMINATION. This prior art reference describes methods for handling exceptions caused by speculatively scheduled instructions or predicated instructions executed within a computer program. The method for speculatively scheduled instructions includes checking (at a commit point of a speculatively scheduled instruction), a semaphore associated with the speculatively scheduled instruction and branching to an error handling routine if the semaphore is set. A set semaphore indicates that an exception occurred when the speculatively scheduled instruction was executed. For a predicated instruction the method includes checking a predicate of an eliminated branch and a semaphore associated with the speculative instruction at a commit point of the speculative instruction and branching to an error handling routine if the semaphore indicates that an exception occurred when said speculative instruction was executed, and the predicate is true, which indicates that said speculative instruction was properly executed.

The present invention differs from U.S. Pat. No. 5,923,863 in that the present invention does not deal with "SPECULATIVE" perdition of program behavior. Instead, the present invention deals with the interactive communication between a client task and a host task, should the host task be suspended by the operating system.

Yet another prior art method to which the method of the present invention generally relates is detailed in U.S. Pat. No. 5,815,708 entitled METHOD AND APPARATUS FOR DYNAMICALLY LOADING METHOD CALL EXCEPTION CODE IN RESPONSE TO A SOFTWARE METHOD EXCEPTION GENERATED IN A CLIENT/ SERVER COMPUTER SYSTEM. This prior art reference describes a method for handling method calls in a client/ server computer system, and includes the step of receiving, at a server computer, a method call generated by a client computer. The server computer then attempts to execute the method call and subsequently generates an exception. The exception is passed to the client computer. The client computer matches the exception to exceptions in an exception list stored in the client computer to obtain an exception object identifier. The exception object identifier is used to load exception code into the client computer. The exception code is then processed. Thus, the exception code need not be loaded at the time of generating the method call. Instead, it is only loaded when it is required at run time.

The prior art reference of U.S. Pat. No. 5,815,708 differs from the method of the present invention in that this prior art deals with loading an exception handling procedure dynamically should an exception happen during program execution. The present invention, on the other hand, relates to interactive communication between a client task and a host task should the host task be suspended by the operating system.

Yet another prior art method to which the method of the present invention generally relates is detailed in U.S. Pat. No. 5,815,702 entitled METHOD AND SOFTWARE PRODUCTS FOR CONTINUED APPLICATION EXECUTION AFTER GENERATION OF FATAL EXCEPTIONS. This prior art reference describes a method of operating a computer and a software product, by enabling a computer system and application to continue execution after the application has generated a fatal exception. This allows the user to save any data file that was being used at the time the fatal exception was generated, and thereby not lose that data that would have otherwise been lost by the operating system spontaneously terminating the application because of the fatal exception. The method involves receiving a notification that the application has generated an exception, notifying the operating system that the exception has been handled, so as to "fool" the operating system and prevent it from spontaneously terminating the application, and then to enable the application to continue operating so that the user can save any unsaved data by executing a continuous loop of code in place of the main message loop of the faulting application. The continuous loop receives messages and events for the application and passes them to the proper executable components of the application. This software product includes an exception handler that receives notification from the operating system of the fatal exception, a background process that is notified by the exception handler of this occurrence and that prompts the user with an option to terminate or continue the application, and a continuous loop of code instructions that replaces a message loop of the application, thereby enabling it to continue execution.

The method of U.S. Pat. No. 5,815,702 differs from the present invention in that this prior art handles fatal exceptions. The present invention, on the other hand, handles both fatal and non-fatal exceptions. The majority of exceptions handled by the present invention result from the normal execution of a program.

SUMMARY OF THE INVENTION

It is therefore an object of the present invention is to handle multiple program exceptions in a heterogeneous system.

Another object of the present invention is to provide interactive communication between several object programs in a mainframe and a PC client, even if the mainframe programs have been suspended.

Still another object of the present invention is to provide simultaneous communication between several object programs in a mainframe and a PC client, even if the mainframe programs have been suspended.

Still another object of the present invention is to provide duplex communication between several object programs in a mainframe and a PC client even if the mainframe programs have been suspended.

The method of the present invention is useful in a computer system including at least one mainframe server and one client. The program executes a method for handling a suspended task. The method includes the steps of performing a security check on the mainframe server. The program then detects a response from the suspended task. Next, the program monitors and handles the response. Finally, the program activates the suspended task with the response.

Still other objects, features and advantages of the present invention will become readily apparent to those skilled in the art from the following detailed description, wherein is shown and described only the preferred embodiment of the invention, simply by way of illustration of the best mode contemplated of carrying out the invention.

GLOSSARY OF RELEVANT ITEMS

Figure 1:
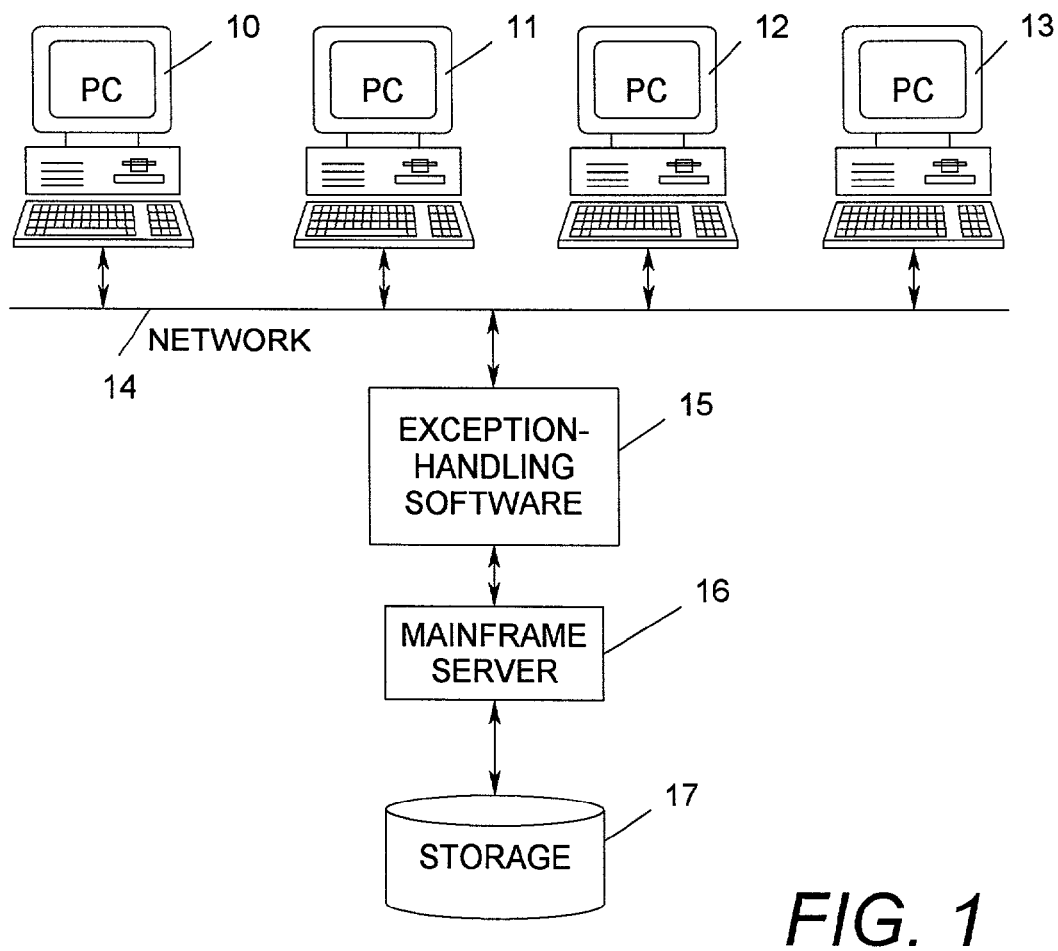
FIG. 1 is a generalized block diagram of a system that may use the method of the present invention.

CHECKING SECURITY (ON THE SERVER): A database is an integrated, centralized group of data files and program utilities that support an application. A dictionary is a special form of database that is used as a repository of information about the definition, structure, and usage of data. The dictionary does not contain the actual data.

The two levels of database and dictionary security are available.

Physical File Security:

Physical file security limits the programs and users that can access designated database or dictionary files. Physical file security is enforced by the system software and can be applied to all A Series (Unisys NXxxx Series Mainframe computer) database management systems (DBMSs). Physical file security limits access to database files by both database and on-database users.

Logical Security:

Logical security limits access to designated data in a database or dictionary. All A Series DBMSs support logical security, but the method used to define this level of security is dependent on the type of DBMS in use. Logical security limits access to the information in the database by users and programs.

The main focus of this section is physical file security. An overview of the logical security mechanisms is provided, along with appropriate pointers to the manuals containing the detailed information.

CHILD-EVENT: Initiation of an asynchronous process consists of setting up a separate stack for the process, passing any parameters (call-by-name or call-by-value), and beginning the execution of the procedure. The initiating program continues execution, and both the initiating program and the initiated procedure run in parallel. The task being initiated is called CHILD TASK. An event belongs to a Child Task is a Child Event.

CHILD TASK: Initiation of an asynchronous process consists of setting up a separate stack for the process, passing any parameters (call-by-name or call-by-value), and beginning the execution of the procedure. The initiating program continues execution, and both the initiating program and the initiated procedure run in parallel. The task being initiated is called CHILD TASK.

DATABASE ENGINE: This is a software program that provides database management functions such as managing database files, providing access to user programs, managing memory and other functions.

DATABASE OPERATION CENTER: Database Operations Center is a graphical user interface (GUI) that provides a client-server front-end for Enterprise Database Server Standard Edition and Enterprise Database Server Extended Edition database utilities on ClearPath servers.

DATABASE OPERATIONS CENTER: (i) Performs administrative functions for Enterprise Database Server Standard Edition Utilities; (ii) retains the Enterprise Database Server Standard Edition utility command line for optional use; (iii) supports Enterprise Database Server Extended Edition utility related enhancements; (iv) runs on Windows 95, Windows 98, Windows Me, Windows NT 4.0, or Windows 2000 compatible client platforms; (v) conforms to the look and feel of the Client Access Services Administration Utilities.

DUPLEX COMMUNICATION: In data communications, a type of transmission in which information can be sent in both directions at the same time. Synonym for two-way simultaneous communications.

EVENT: An event provides a means to synchronize simultaneously executing processes. An event can be used either to indicate the completion of an activity (for example, the completion of a direct I/O read or write operation) or as an interlock between participating programs over the use of a shared resource.

FILE ATTRIBUTES: A file attribute is an element that describes a characteristic of a file and provides information the system needs to handle the file. Examples of file attributes are the file title, record size, number of areas, and date of creation. For disk files, permanent file attribute values are stored in the disk file header. For tape files, the attribute values are stored in the tape label. A file attribute enables you to interrogate or modify the I/O subsystem information that defines your file. You can access the I/O subsystem file information only through file attributes. Each file attribute defines a characteristic of the file. Changing the value of a single attribute affects the file defined by that attribute and can cause the values of other attributes to change as well.

HARDWARE EXCEPTION: An exception caused by requiring hardware resource. For example, Disk space is needed or tape is needed on a tape drive.

HETEROGENEOUS SYSTEM: (Unisys NXxxx Series Mainframe). A high-performance, low-latency HMP (Heterogeneous Multi-Processor) interconnect technology for ClearPath NX servers. It provides an efficient means for system software in the MCP (Master Control Program operating system) and Windows environments to communicate with each other.

OBJECT PROGRAMS (TASKS): A program. (1) A specification of the sequence of computational steps that solve a computational problem. The steps are written (coded) in a particular programming language. (2) An object code file.

OBTAINING A LOCK (FOR SINGLE THREADING): To prevent access to particular data in the database by other users when one user is accessing it.

OFFSPRING TASKS: This is the same as a Child Task.

PARENT-EVENT: Initiation of an asynchronous process consists of setting up a separate stack for the process, passing any parameters (call-by-name or call-by-value), and beginning the execution of the procedure. The initiating program continues execution, and both the initiating program and the initiated procedure run in parallel. The initiating task is called PARENT TASK. An event that belongs to a parent task is called a PARENT EVENT.

PARENT PIPE: A feature that provides one-way or two-way communication between a server process and one or more client processes. Client applications can use named pipes to access MCP (Master Control Program) and NT server applications in a secure manner. A pipe belongs to a Parent Task.

PARENT TASK: Initiation of an asynchronous process consists of setting up a separate stack for the process, passing any parameters (call-by-name or call-by-value), and beginning the execution of the procedure. The initiating program continues execution, and both the initiating program and the initiated procedure run in parallel. The initiating task is called PARENT TASK.

PIPE: A feature that provides one-way or two-way communication between a server process and one or more client processes. Client applications can use named pipes to access MCP and NT server applications in a secure manner.

PORT FILE: A type of file for which file operations occur between a local user process and another process on the same host or on a remote host that is reachable through a network. A port file is made up of one or more subfiles, each of which supports one dialog.

PROGRAM EXCEPTION: (1) In data management, an error result returned to an application program by the data management software, explaining the reason a requested database operation was not performed. (2) In the Print System, anything unusual that happens to a print request and prevents the request from being carried out.

SERVICE PROGRAM: A Database Operation Center component whose task is to send a message to a host from a client and receive a message from a host which then passes to a client.

SETTING UP TASK: In some cases, you might want certain task attributes to be assigned the same values each time a program is run. For many task attributes, you can achieve this effect by including statements in the source program that assign task attributes to the MYSELF task variable. However, some task attributes can only be assigned before process initiation. For a WFL job (Work Flow Language), you can assign such task attributes in the job attribute list. For programs written in other languages, you can assign such task attributes to the object code file. The task attributes stored in the object code file are used whenever the object code file is initiated, unless they are overridden by later task attribute assignments. You can assign task attributes to the object code file at compile time through the use of compiler task equations, which can be included in the WFL or CANDE (command and edit) COMPILE statements. You must be careful to distinguish between task equations that affect the compilation itself and task equations that affect the resulting object code file.

SINGLE THREADING: Signifies that a task is running one at a time.

SOFTWARE EXCEPTION: An abnormal exit occurs for the block that is caused by software. This can be a software failure or a fault. A fault is an invalid action that is detected by the hardware, such as an attempt to divide by zero. In general, a process is discontinued if it encounters a fault. However, ALGOL and NEWP languages provide a feature that can be used to allow the process to continue normal execution after most faults. The ON statement specifies actions to be taken if a fault occurs. In addition, the ON statement can be used to interrogate the type of fault and the stack history. The stack history value returned is identical in format to that returned by the STACKHISTORY task attribute. The ON statement can specify which particular fault types it is to handle, or can include the ANYFAULT clause to handle all eligible faults. Certain faults such as stack overflows cannot be handled by the ON statement. If any fault occurs that can be handled, the following ON statement stores the stack history into array FAULTARRAY and the number into FAULTNO.

SPECIFIC TASK NUMBER: It is also called a "mix number". A unique, externally visible number that identifies a process while it is executing.

STOPPAGE OF TASKS (for Lack of Resources): A task is being suspended due to lack of system resources such as disk space or tape.

STRING VARIBLE (OF THE CHILD): The Taskstring attribute value of a child task.

STRING VARIABLE (OF THE PARENT): The Taskstring attribute value of a parent task.

STRING VARIABLE (OF THE PARENT) PARENT TASK: The task string attribute of a parent task of a parent task. That is one task processes a task and that task process another task. The taskstring attribute value of the first task.

STRING VARIABLES (CONNECTED TO A TASK): A string of up to 255 EBCDIC characters of which the last must be a null character. The TASKSTRING task attribute stores any string value that is assigned to it by a user. The value of this attribute has no effect on the process nor does it report any information about the process. Rather, it is provided for use in communicating information between processes.

SUSPENDED TASKS IN MAINFRAME: Tasks that need operator or user action because they are suspended on an RSVP condition. RSVP message—A message the system displays for a suspended process that states the reason the process was suspended. RSVP messages ask for a reply such as OK or DS.

TASK: Tasking features are inherent in the overall system architecture. Various programming languages and operations interfaces provide you with access to different subsets of the tasking capabilities of the system. This section presents an overview of tasking features and discusses the advantages and limitations of these features.

TASKING CONCEPTS: The following subsections discuss the relationships between programs and processes, and the methods you can use to monitor and control process behavior.

Programs And Processes: A program is a sequence of statements written in any of a number of languages, including ALGOL, C, COBOL74, COBOL85, FORTRAN77, Pascal, and Work Flow Language (WFL). The file in which you write and store these statements is referred to as a source file. By compiling the source file, you cause the creation of an object code file. By using any of a number of commands or statements, you can cause a particular object code file to be initiated. That is to say, you cause the system to start performing the instructions in the object code file. At this point, the object code file is being executed. However, in a sense, nothing is happening to the object code file itself. The system merely reads instructions from the object code file; the contents of the file remain unchanged. There is, nonetheless, a dynamic entity called a process, which is separate from the object code file, but which reflects the current state of the execution of the object code file. A process stores the current values of variables used by the program, as well as information about which procedures have been entered and which statement is currently being executed. (Procedures are discussed under "Internal and External Processes" later in this section.) Each process exists in the system memory, and consists of several distinct structures. The distinction between object code files and processes is a very important one. This is because, at any given time, there can be multiple processes that are executing the same object code file; these are referred to as "instances" of that object code file. A new instance is created each time a user or an existing process submits a statement that initiates the object code file. Because many instances of the same object code file can be running at the same time, the object code file title is not sufficient to uniquely identify a process. Therefore, in system command displays, the various processes are identified both by an object code file title and by a unique number called the "mix number".

Even if processes are executions of the same object code file, the processes are completely separate entities and do not interact with each other. For example, suppose the object code file called OBJECT/PROG includes a declaration of an integer variable named N, as well as various statements that assign values to N. In this case, each instance of OBJECT/PROG has its own copy of variable N in memory. When one process changes the value of N, there is no change to the value N has for the other processes.

The fact that processes are separate and maintain their own copies of variables generally prevents confusion and simplifies program design. However, there can also be cases where you want processes to have shared access to a particular variable. For these cases, the system provides a variety of inter process communication techniques. Tasking consists of using various features to initiate, monitor, and control processes. You can perform tasking functions by entering commands through various system operation interfaces, or by writing programs that initiate, monitor, and control the execution of other programs.

THREADING: (1) (X/Open) The entity, with all its context, that is currently in control of a processor. The context can include locks on shared resources and open files. For portability reasons, the notion of thread must be common among the application program, transaction manager (TM), and resource manager (RM). (2) The entity that is currently in control of the processor. In enterprise servers, a thread of control is equivalent to a process or task.

DETAILED DESCRIPTION OF ONE EMBODIMENT

Referring now to the drawings and FIG. 1 in particular, a block diagram of a computer system is shown in a client-server network including PC clients 10, 11, 12, and 13, and a mainframe server 16. PC clients 10, 11, 12, and 13 are connected via a network 14 and interface with the mainframe server 16 through network 14. The mainframe server 16 runs exception-handling software 15. The mainframe server utilizes a storage device 17.

Figure 2:
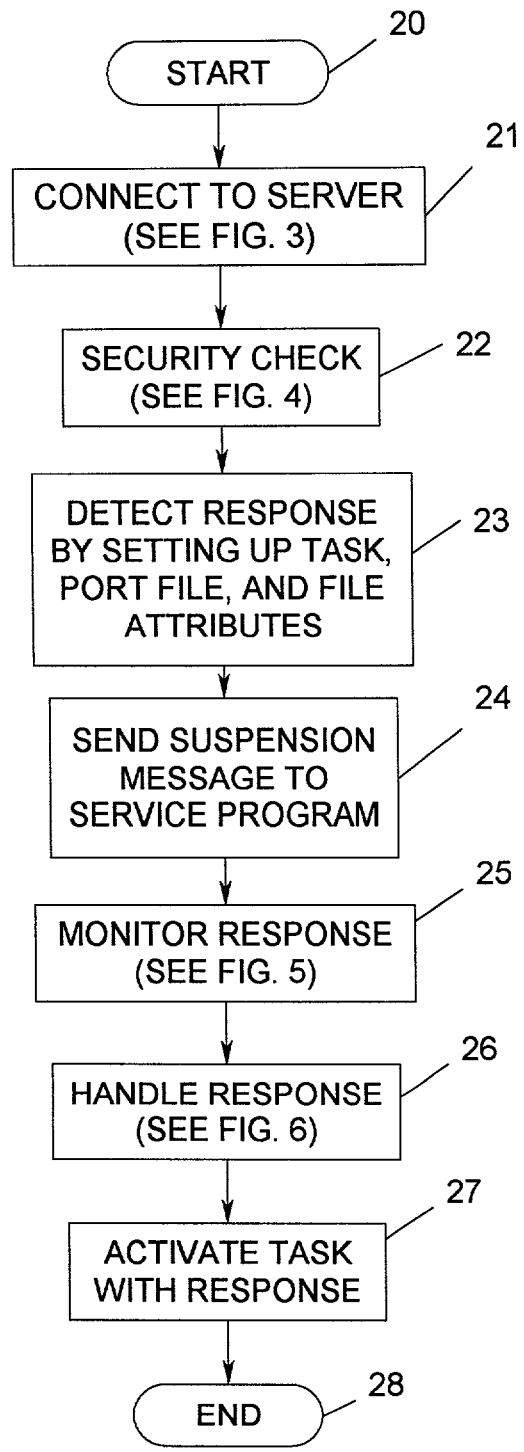
FIG. 2 is a flowchart that illustrates the general steps involved in handling a response to an exception.

With reference to FIG. 2, a flowchart illustrating the general steps involved in handling a response is shown. This response is activated by a "software exception" which indicates an error condition that changes the normal flow of a program or task. The process begins with start bubble 20 followed by a process step (block 21) to connect to the server. The process continues by performing a security check (block 22). Next, the process detects a response by setting up task, port file, and file attributes (block 23). When a task is indicated, the DB Center Serve component sets up a unique port file with unique task attribute values. For example:

Run system/DM Utility (DB=<db name>DUMP=to backup 1); File DB<port=__; SW>=True

The process continues with a process step (block 24) which sends a suspension message to the service program. The service program provides the connection between the client and the server. It also provides the message flow between the client and server. After this message, the process monitors a response (block 25) from the client (10, 11, 12, 13) or the Server 18, and handles the response (block 26). The process then activates the suspended task with the response (block 28). The process then exits (end bubble 27).

Figure 3:
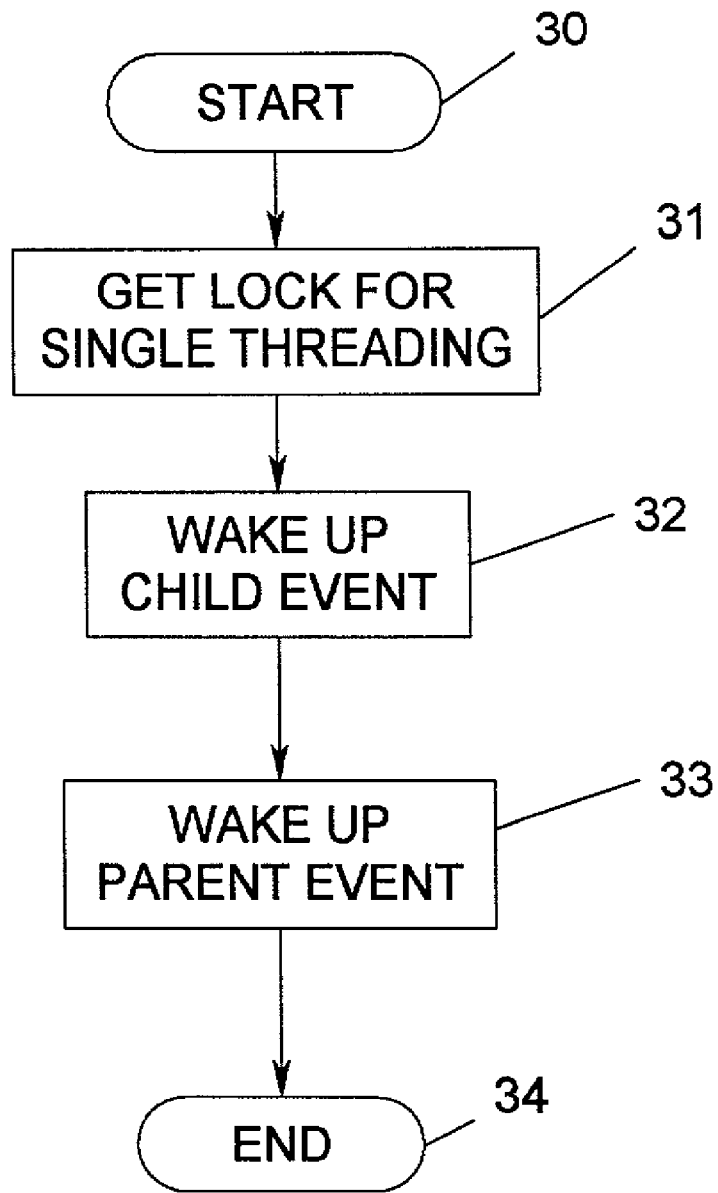
FIG. 3 is a flowchart illustrating the steps for connecting to the server.

Referring now to FIG. 3, a flowchart illustrating the steps for connecting to the server is shown. The process begins with start bubble 30 followed by a process step (block 31) to obtain a lock for single threading. The process then wakes up the child event (block 32). After waking up the child event, the process wakes up the parent event (block 33). The process then exits (end bubble 34).

Figure 4:
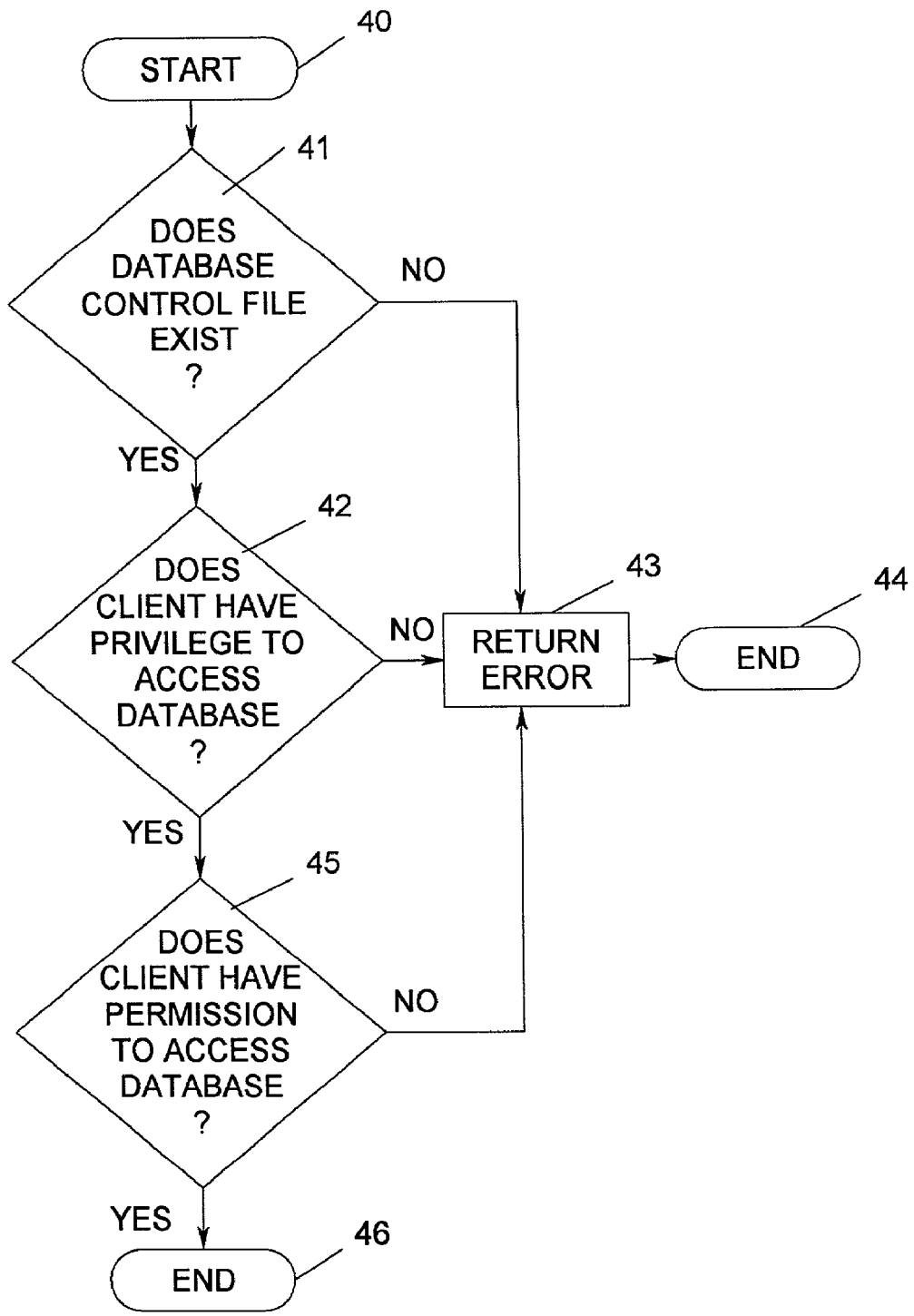
FIG. 4 is a flowchart that illustrates the steps for checking security on the server.

With reference to FIG. 4, a flowchart that illustrates the steps for checking security on the server is shown. Enterprise Database Security is critical to the site security. This is to enforce the security at the Database Level. Many vendors have security at the system level. The process begins with start bubble 40 followed by an inquiry (diamond 41) as to whether or not a database control file exists on the mainframe server 16.

The database control file is used to verify that all database data files are compatible by checking the database time stamps. It also stores audit control information and dynamic database parameters. It also is used for controlling database interlock so as to lock the database from any changes during specific operating functions. If the answer to this inquiry is no, the process returns an error (block 43) and exits (end bubble 44). If the answer to this inquiry is yes, the process continues with an inquiry as to whether or not the PC client 10 has privileges to access the database 17. If the answer to this inquiry is no, the process returns an error (block 43) and exits (end bubble 44). On the other hand, if the answer to this inquiry is yes, the process continues with an inquiry as to whether or not the PC client 10 has permission to access the database 17. If the answer to this inquiry is no, the process returns an error (block 43) and exits (end bubble 44). If the answer to this inquiry at step 45 is yes, the process then exits (end bubble 46).

Figure 5:
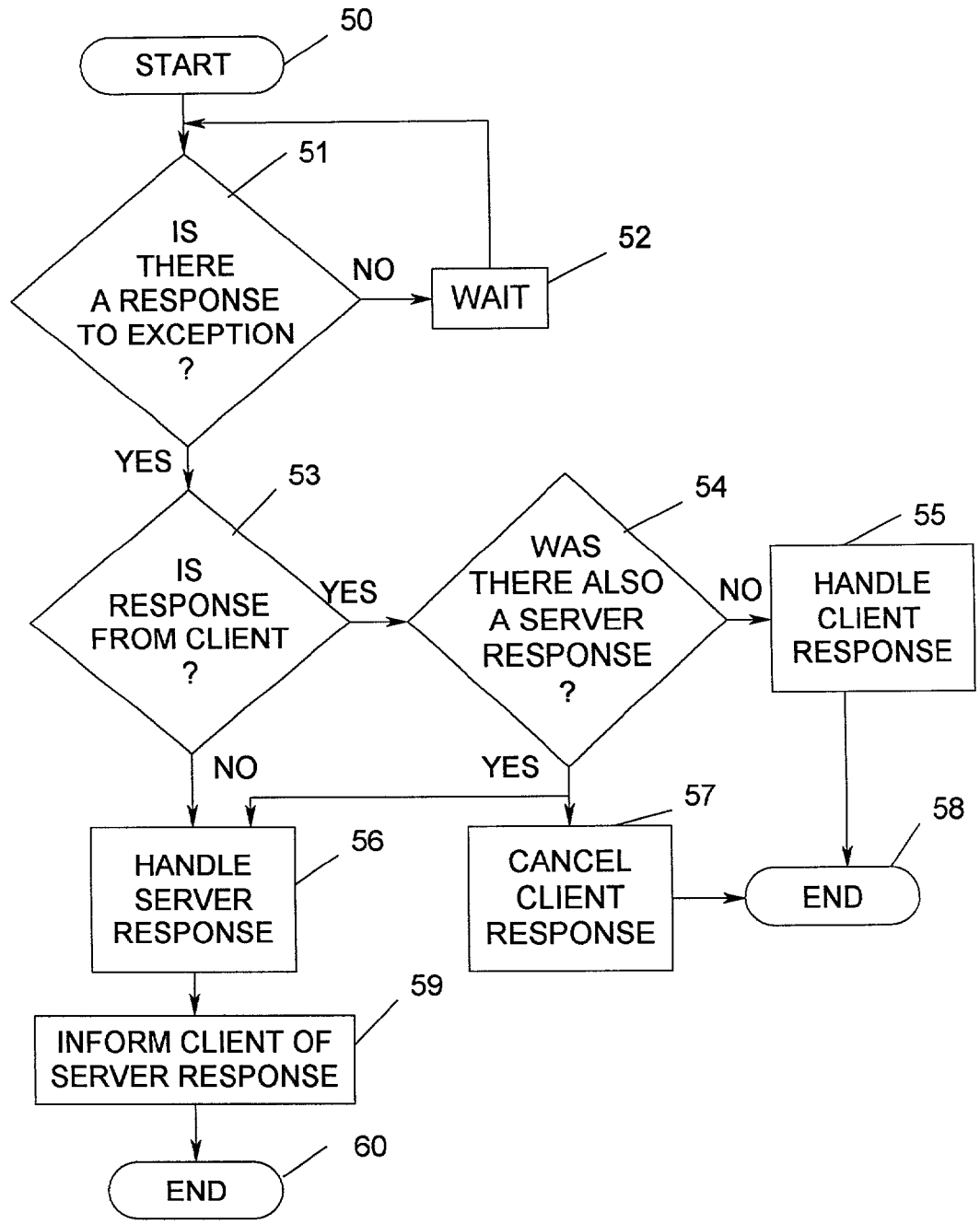
FIG. 5 is a flowchart that illustrates the steps for monitoring a response to an exception.

Referring now to FIG. 5, a flowchart illustrating the steps for monitoring a response to an exception signal is shown. The process begins with start bubble 50 followed by an inquiry as to whether or not there has been a response to the exception (diamond 51). If the answer to this inquiry is no, the process waits (block 52). The process returns to diamond 51 and loops until the answer to the inquiry posed by diamond 51 is yes. If the answer to the inquiry posed by diamond 51 is yes, the process continues with an inquiry as to whether or not the exception response was generated by the PC client 10 (diamond 53). If the answer to this inquiry is yes, the process continues with an inquiry as to whether or not there was a server response in addition to the client response (diamond 54). If the answer to this inquiry is no, the process then handles the client response (block 55) and exits (end bubble 58) Handling the response means programmatically calling the operating system and providing the response for the waiting program. On the other hand, if the answer to the inquiry posed by diamond 54 is yes, the process ignores the client response (block 57) and exits (end bubble 58). This is ignored because the response has already been provided to the waiting program by the user from the mainframe. Returning to diamond 53, if the answer to the inquiry is no, the process handles the server response (block 56). The Server invokes the operating system and provides the operating system with the response. The operating system then applies the response to the waiting program. After handling the server response, the process continues with a process step (block 59) to inform the client of the server response. The process then exits (end bubble 60).

Figure 6:
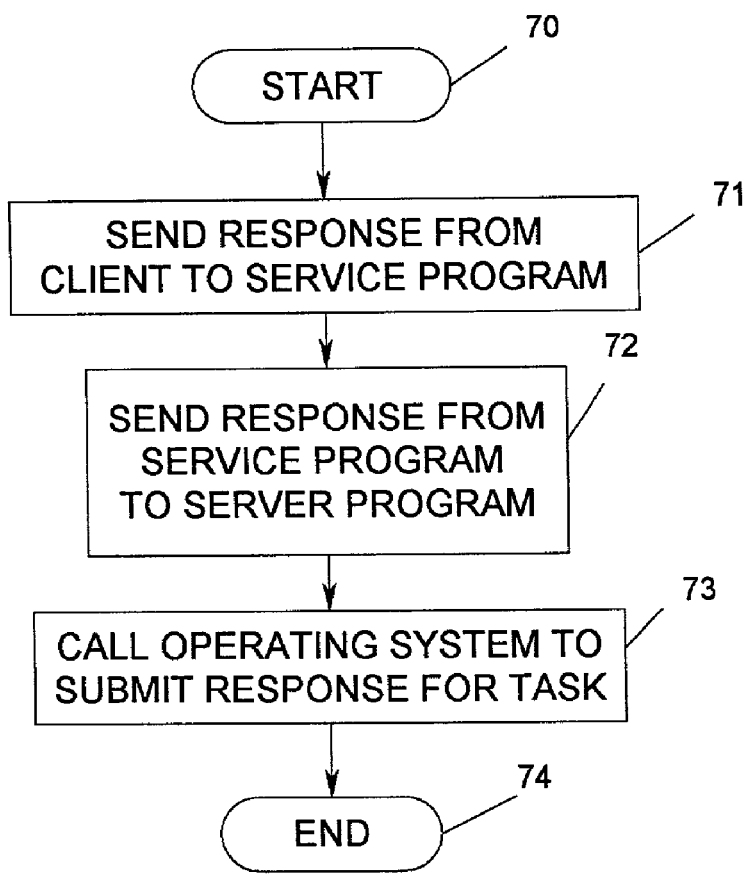
FIG. 6 is a flowchart that illustrates the steps for handling a response.

With reference to FIG. 6, a flowchart illustrating the steps for handling a response is shown. The process begins with start bubble 70 followed by a process step (block 71) to send the response from the PC client 10 to the service program. A typical exception is:

WARNING—<DATABASE>CONTROL
EXISTS—AX TO CONTINUE RESPONSE

The program then sends the response from the service program to the server program (block 72). The server program is responsible for initiating tasks that are requested by the client. It provides client information about the databases on the mainframe, when requested. Next, the process calls the operating system of the mainframe computer to submit a response for the task (block 73). Tasks are the means of the client to perform database functions on the mainframe. An example would be to run a re-organization of the database. The process then exits (end bubble 74).

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system including at least one mainframe server and one client, a method for handling a suspended task, said method comprising the steps of:
    (a) performing a security check on said mainframe server, wherein said step of performing a security check on said mainframe server includes the steps of:
        (a1) determining if a database control file exists on said mainframe server, and if not, returning an error;
        (a2) determining if said client has a privilege to access said mainframe server, and if not, returning an error;
        (a3) determining if said client has a permission to access said database, and if not, returning an error;
    (b) detecting a response from said suspended task;
    (c) monitoring said response wherein said step of monitoring said response includes the steps of:
        (c1) determining if said response is from said mainframe server, and if so, notifying said client of said response;
        (c2) determining if said response is from said client, and if so;
        (c3) determining if a server response has been issued, and if so, canceling said response from said client;
    (d) handling said response wherein said step of handling said response includes the steps of:
        (d1) sending said response from said client to a service program on said mainframe server;
        (d2) sending said response from said service program to a server program on said mainframe server;
        (d3) making an operating system call on said mainframe server to submit said response for said suspended task to said client;
    (e) activating said suspended task with said response.

2. The method as in claim 1 wherein said suspended task may have resulted from a program exception.

3. A storage medium encoded with machine-readable computer program code enabling a method for handling a suspended task and notifying a client, said method comprising the steps of:
    (a) performing a security check on said mainframe server
        (a1) determining if a database control file exists on said mainframe server, and if not, returning an error;
        (a2) determining if said client has a privilege to access said mainframe server, and if not, returning an error;
        (a3) determining if said client has permission to access said database, and if not, returning an error;
    (b) detecting a response from said suspended task;
    (c) monitoring said response wherein said step of monitoring said response includes the steps of:
        (c1) determining if said response is from said mainframe server, and if so, notifying said client of said response;
        (c2) determining if said response is from said client, and if so, notifying said client;
        (c3) determining if a server response has been issued, and if so, canceling said response from said client;
    (d) handling said response wherein said step of handling said response includes the steps of:
        (d1) sending said response from said client to a service program on said mainframe server;
        (d2) sending said response from said service program to a server program on said mainframe server;
        (d3) making an operating system call on said mainframe server to submit said response for re-activating said suspended task;
    (e) activating said suspended task with said responses.

4. In a network where multiple client PC's can initiate program tasks and operate in communication with a mainframe server and database storage means, wherein said server includes a service program which connects said client PC and said server, a system for handling a suspended task comprising:
    (a) means to connect to said server;
    (b) means to execute a security check on said server;
    (c) means for detecting a response from said server;
    (d) means to send a suspension message to said service program to indicate a suspended task (exception);
    (e) means to monitor any response from said client-PC or said server;
    (f) means to handle said response that was monitored;
    (g) means to activate said suspended task;
    wherein each I/O Read/Write operation or each interlock between participating programs using a shared resource is designated as an event and wherein said means (a) to connect includes:
        (a1) means for setting a lock for single threading;
        (a2) means to initiate a child event which involves a task initiated by a parent event;
        (a3) means to initiate a parent event which sets up a separate stack for a process.

5. The system of claim 4 wherein said means (b) to execute a security check includes:
    (b1) means to check if a database control file is in existence, and, if so;
    (b2) means to check if said client-PC has privilege to access said database storage means and if so;
    (b3) means to check if said client-PC has permission to access said database storage means, and if so;
    (b4) means to enable said means for detecting a response.

6. The system of claim 4 wherein said means (e) to monitor any response includes:
    (e1) means to determine if there is a response to a suspended task (exception), and if so;
    (e2) means to check if said response is from a client-PC, and if so;
    (e3) means to check if there was also a server response, and if so;
    (e4) means to cancel said client-PC response;
    (e5) means to handle said server response;
    (e6) means to inform said client-PC of said server response.

7. The system of claim 6 wherein said means (e3) to check for a server response shows that no server response was indicated, then said means (e3) includes:
    (e31) means to handle said client response.

8. The system of claim 4 wherein said means (f) to handle said response that was monitored includes:
    (f1) means to send said response from said client-PC to said service program;
    (f2) means to send said response from said service program to said server;
    (f3) means to call the operating system in said server to submit a response, for the suspended task, to said client-PC.

* * * * *